United States Patent

[11] 3,578,070

[72] Inventor Ive L. Martin
 P.O. Box 2256, Modesto, Calif. 95351
[21] Appl. No. 753,380
[22] Filed Aug. 19, 1968
[45] Patented May 11, 1971

[54] APPARATUS FOR SALVAGING BLUE POWDER FROM ZINC ORE FURNACES AND THE LIKE
 9 Claims, 17 Drawing Figs.
[52] U.S. Cl. ................................................. 165/61,
 214/21, 266/13, 263/37
[51] Int. Cl. ............................................. C22b 19/02
[50] Field of Search ........................................ 266/11, 13,
 20, 21, 19, 24; 263/37, 38; 75/86, 88; 214/21;
 165/61

[56] References Cited
UNITED STATES PATENTS

| | | | |
|---|---|---|---|
| 953,405 | 3/1910 | Wettengel | 263/37 |
| 1,048,420 | 12/1912 | Londress et al. | 263/38 |
| 1,089,110 | 3/1914 | Chappell | 263/37 |
| 2,536,365 | 1/1951 | Handwerk et al. | 266/21X |

FOREIGN PATENTS

| 425,987 | 6/1911 | France | 263/37 |
|---|---|---|---|

Primary Examiner—J. Spencer Overholser
Assistant Examiner—R. Spencer Annear

ABSTRACT: A material smelting and processing plant which is usable for smelting zinc ore or also glass materials. It includes a main housing, the upper portion of which contains ore or glass smelting containers or pots, with heating means for raising their temperature to the smelting point, so that the zinc ore is smelted into liquid metallic zinc which is decanted from the pots, while the remaining blue powder containing richly zinc is reamed out and dropped into a compartment in the basement of the main housing and onto conveyors for carrying it to an end receptacle for further smelting and processing. The remaining zinc ore slag is then reamed out of the pots and dropped into a waste compartment in the basement and onto conveyors for removal as waste. Cooling sprays are in the basement for reducing the temperature of the materials and to protect the conveyors and compartments from the intense heat. The plant when used to produce glass also has means for removing the glass from the containers, dropping it into the basement onto conveyors and refrigeration for cooling the spray fluid below freezing to cool the hot glass. It is then conveyed to end receptacles for further processing such as crushing, etc.

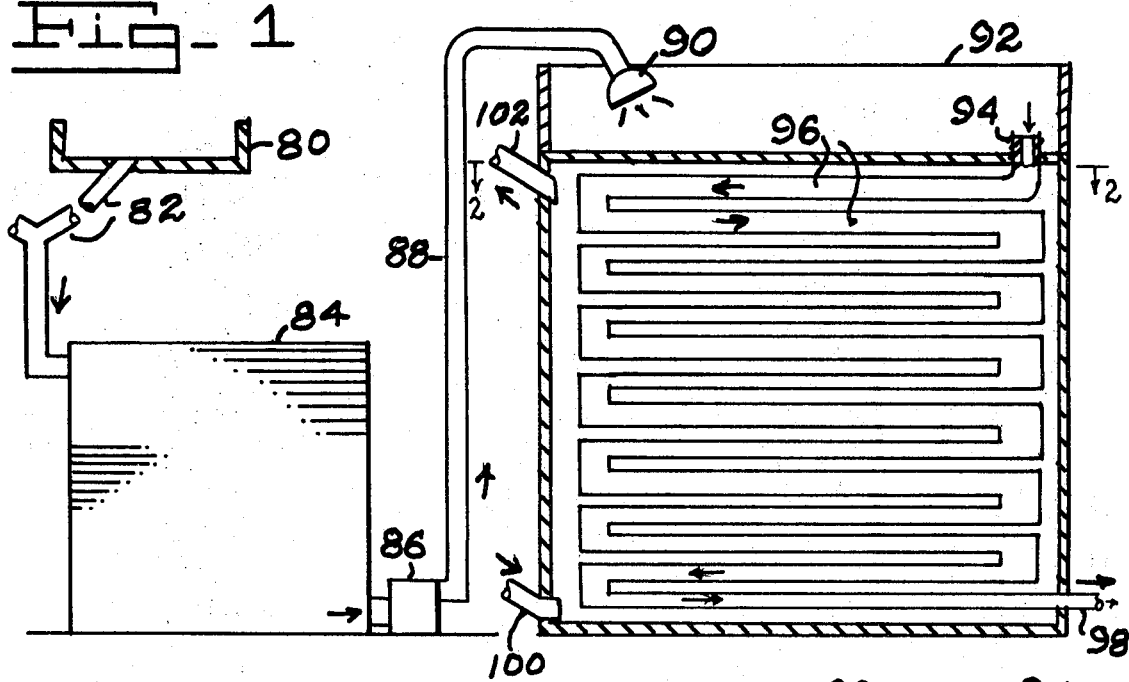
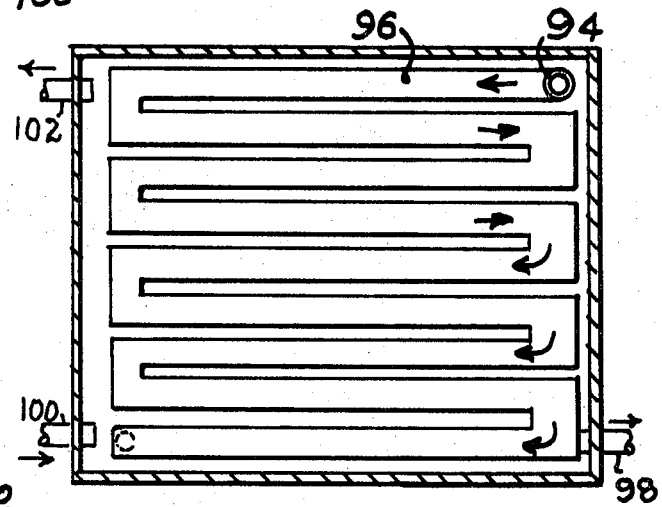
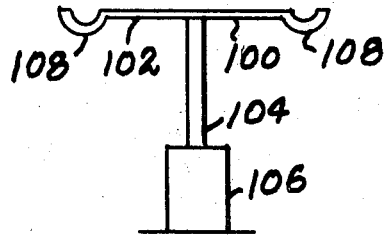
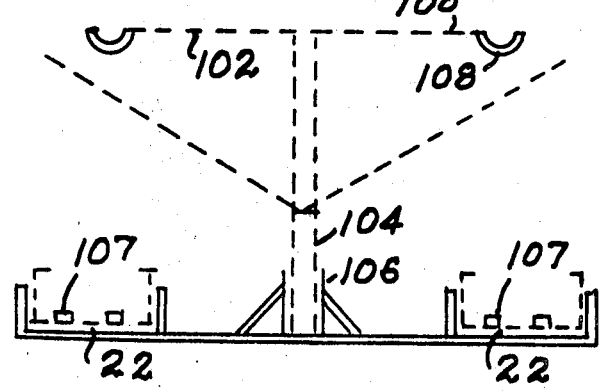
INVENTOR.
IVE L. MARTIN
BY

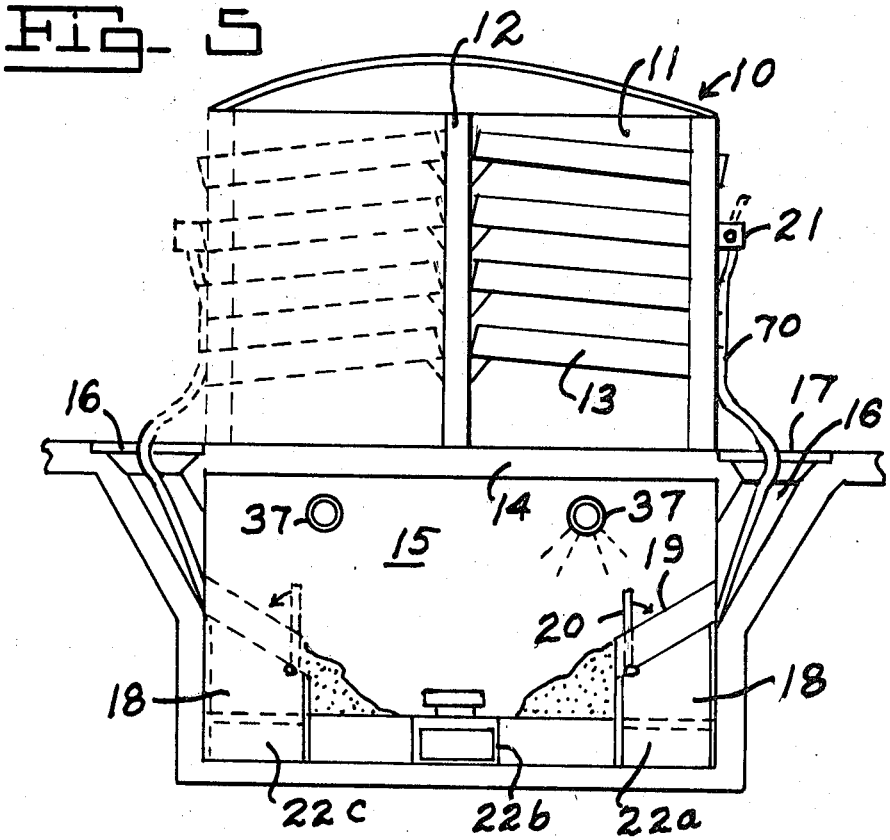
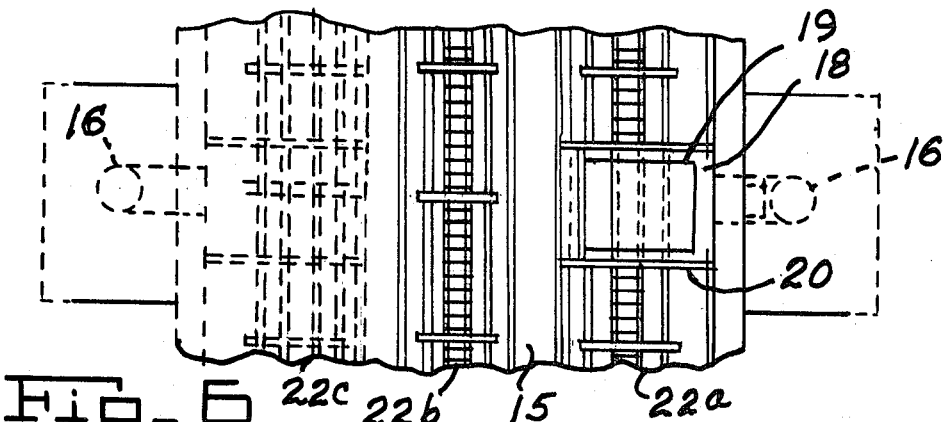

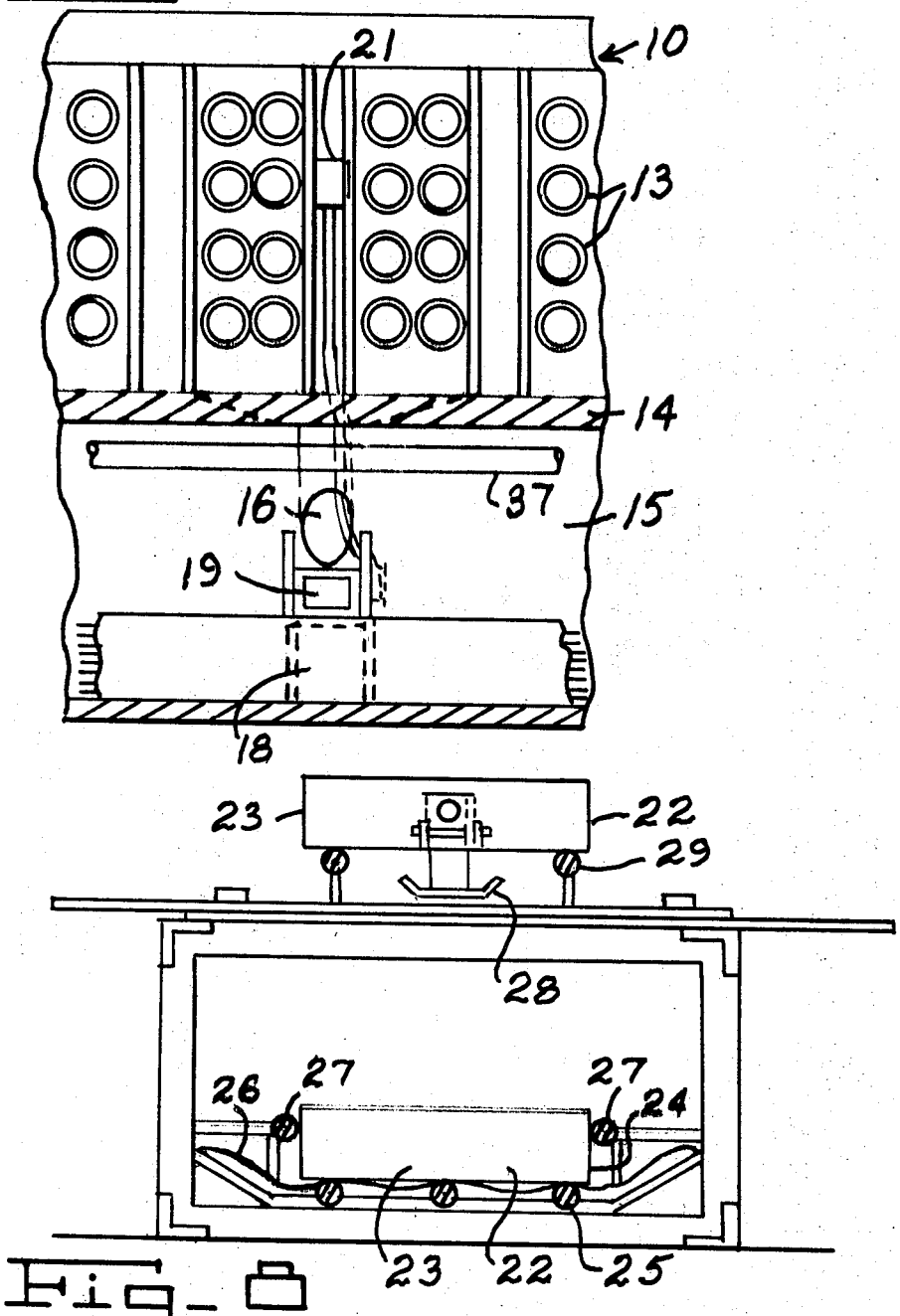

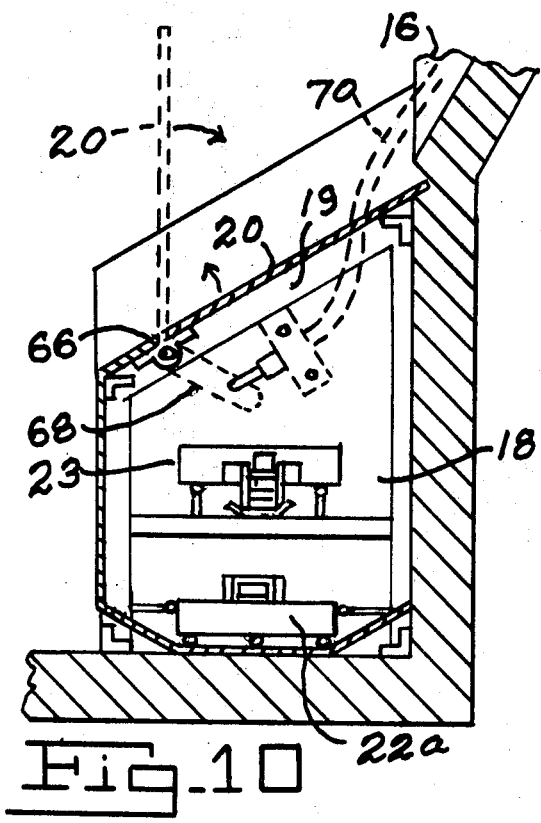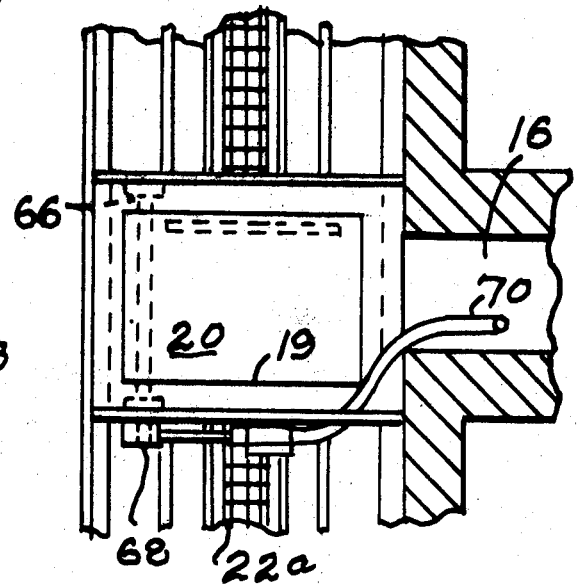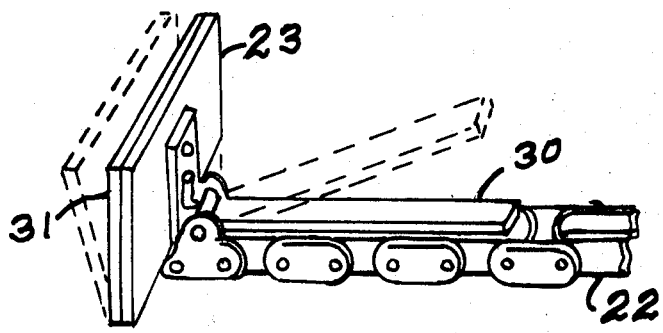

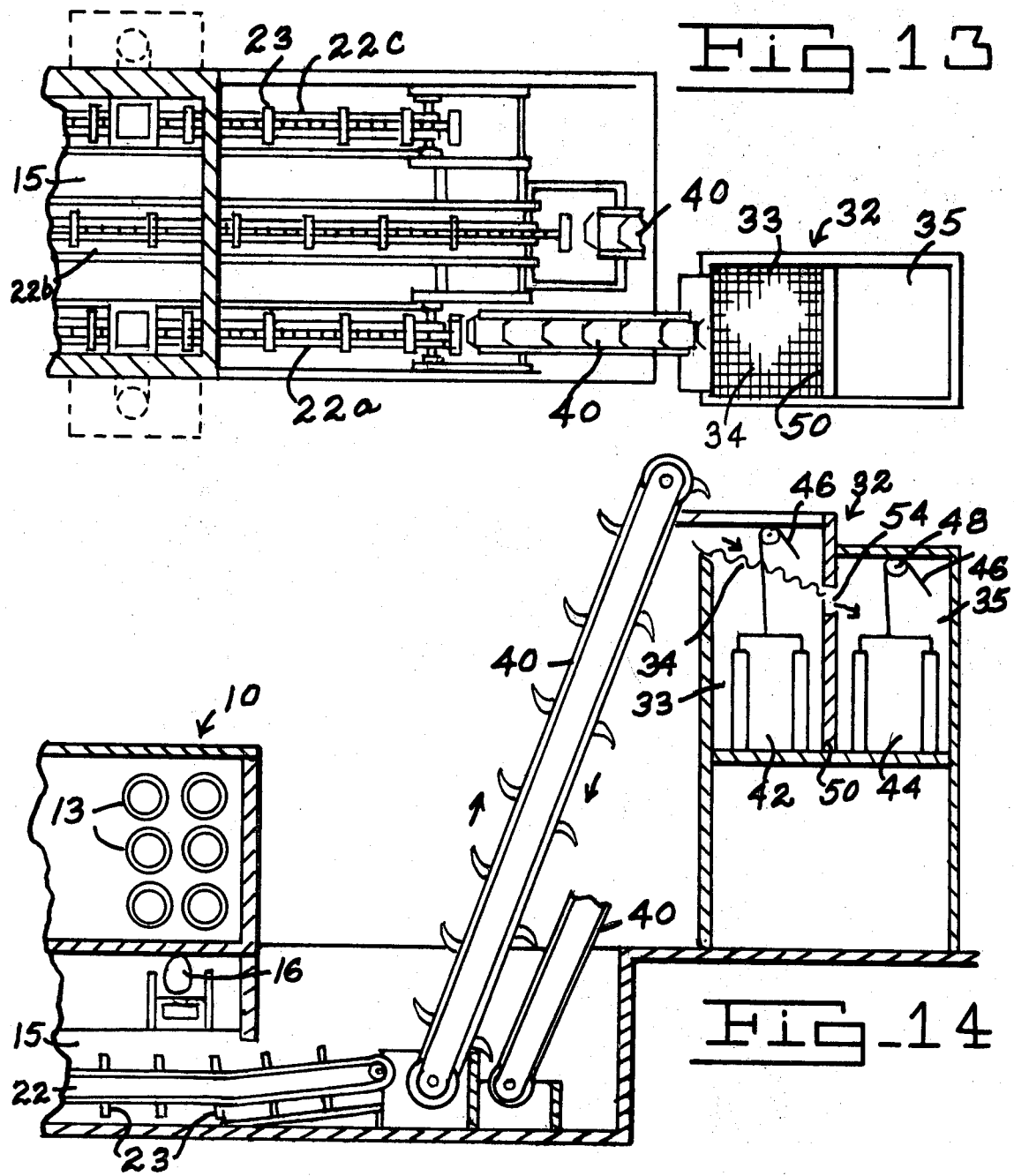

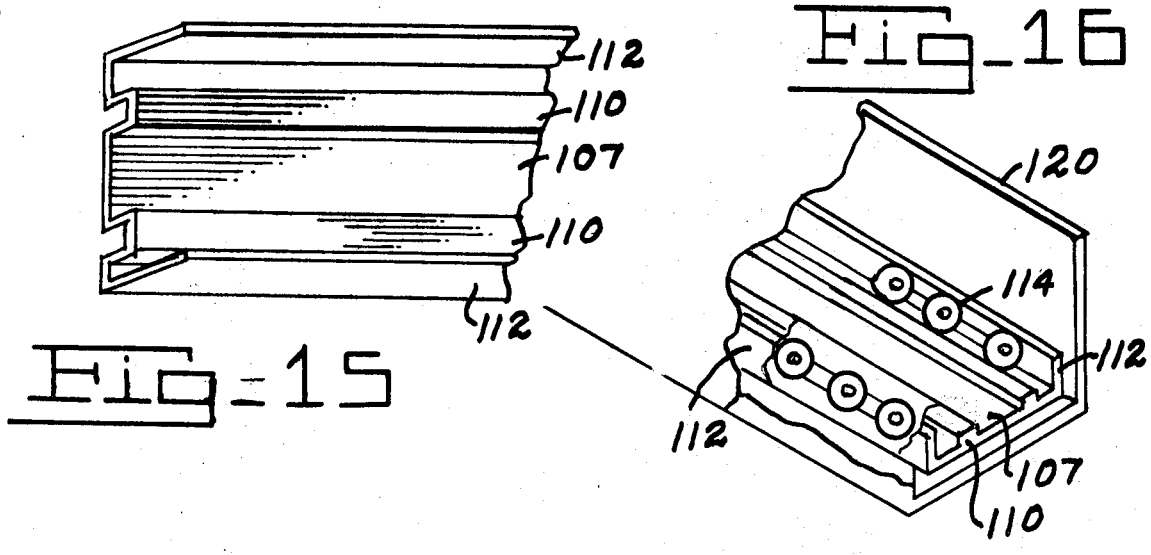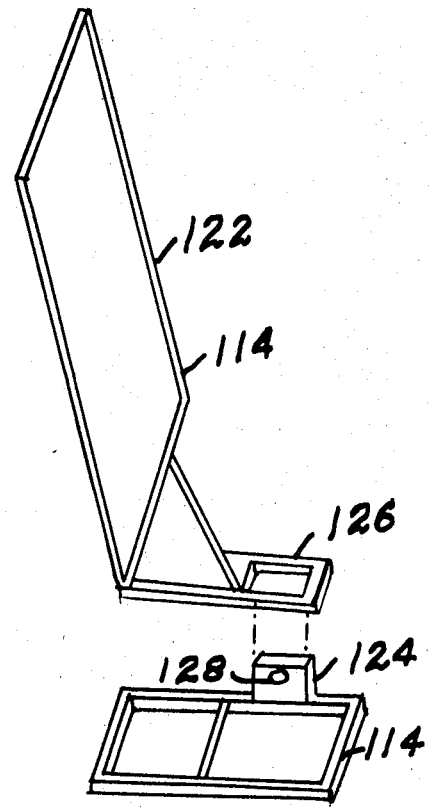

APPARATUS FOR SALVAGING BLUE POWDER FROM ZINC ORE FURNACES AND THE LIKE

This invention relates to improvements in devices for salvaging and recovering residues from ore smelting furnaces and the like.

An object of the invention is to provide a novel and improved device for recovering and salvaging residues remaining from the process of smelting ore in furnaces, to reduce wastage and improve efficiency of the process.

Another object of the invention is to provide a novel and improved apparatus and method for salvaging and recovering blue powder from zinc ore smelting furnaces, in which the ore is charged into pots and smelted in the furnace, the molten ore being then drained from the pots, and the remaining material reamed out in steps to afford optimum recovering of the residues for further processing to the maximum extent possible.

A further object of the invention is to provide a novel and improved apparatus and method for separating the residues remaining in the pots after the molten zinc is drained off, so that the more valuable blue powder is recovered first by partial reaming out of the pots, and carried into one portion of the zinc ore furnace array for being carried into a hopper for further processing, and the remaining less valuable residues remaining in the pots is then reamed out, and carried to another hopper or other place for disposal as waste or possibly treated as low grade residue to recover zinc therefrom if considered worthwhile.

Still another object of the invention is to provide a novel and improved apparatus and method of operation of ore smelting furnace and reaming out the hop pots after the molten ore metal is drained off, so that the blue powder remaining in the pots is first reamed out, dropped through a trap door and guide chute into a blue powder receiving chamber, and being subjected to a cooling water spray to reduce its temperature.

Still a further object of the invention is to provide a novel and improved ore smelting furnace and apparatus in which there is a main upper building for stacking therein of a plurality of pots containing raw ore and means for heating them to smelt metallic metal from the ore, means for tilting said pots to draw off the molten metal, leaving in the pots the metallic oxide residues and wastage from the smelting process, the device including means for reaming out the valuable oxide residues and for delivering the same into a main chamber for further processing, and spray shower means for cooling said residues after leaving said pots.

Still another object of the invention is to provide a novel and improved ore smelting and processing furnace in which after the molten metal is drained off, the residues are sprayed with cold water to cool them off, and carried off by continuously operating conveyor belts into receptacles for further processing depending on their metallic content.

Another object of the invention is to provide a novel and improved glass smelting device in which the ingredients are heated and processed, and conveyed from the furnace by conveyor belts for additional processing into glass products.

The above and other objects and advantages of the invention will become apparent from the following description of a preferred embodiment thereof as illustrated in the accompanying drawings forming a part hereof.

In the drawings:

FIG. 1 is a side elevation of a drain tank and refrigerating tank shown in sectional elevation.

FIG. 2 is a sectional plan view of the device of FIG. 1.

FIG. 3 is an elevation of a shower stand.

FIG. 4 is an elevation of a conveyor slide plate with spray above, suitable also for use in a glass plant.

FIG. 5 is an elevation of a zinc ore smelting plant.

FIG. 6 is a sectional plan view of the plant of FIG. 5.

FIG. 7 is a side elevation in fragment of the plant of FIG. 5.

FIG. 8 is an enlarged scale elevation of the conveyor array seen in the lower portion of FIG. 5.

FIG. 9 is a plan view of a spray system used in the plant of FIG. 5.

FIG. 10 is an elevation on a larger scale of a side portion of the plant of FIG. 5.

FIG. 11 is a top plan view of the plant portion shown in FIG. 10.

FIG. 12 is a perspective view of a conveyor drag chain with scoop plate carried thereon.

FIG. 13 is a top plan view showing all three conveyor arrays of the plant of FIG. 5 and the receiving receptacles for the oxides and products recovered.

FIG. 14 is an elevation of the devices shown in FIG. 13.

FIG. 15 is a perspective in fragment of a slide plate with drag rails.

FIG. 16 is a perspective in fragment of a conveyor box with the slide plate of FIG. 15 fitting therein.

FIG. 17 shows a drag link and scoop plate for locking engagement therewith.

In order to understand clearly the nature of the invention and the best means for carrying it out, reference may be had to the drawings, in which like numerals denote similar parts throughout the several views. FIGS. 5 and 7 show a zinc ore furnace 10 constructed with sidewalls 11 and a rear wall 12. The sidewalls 11 separate individual chambers of the furnace and the rear wall 12 divides the furnace 10 into two oppositely facing banks. Pots 13 are filled with unrefined ore and are positioned in the chambers of the furnace with their open ends disposed outwardly in the usual manner.

A floor 14 forms the bottom of the furnaces and a basement area 15 is provided below the furnace floor 14, which serves as a receptacle for waste products from the ore. Openings 16 are provided in the furnace floor 14 just in front of the faces of the furnaces, and form a funnel passageway into the basement for passing the ore waste. To provide a supporting surface for the workman tending the furnace, steel grates 17 are fitted over the upper end of the opening 16 flush with the upper surface of the furnace floor 14.

According to the present practice, the pots 13 are first charged and inserted into the furnace. After proper smelting time has been allowed, the molten ore is drained from the pots, and the remaining material is reamed out before the pot is recharged. The first material recovered by reaming of the pot is known as blue powder, which is high in ore content and must be retrieved for further processing to the maximum extent possible. The present system for retrieving the blue powder consists of placing a steel pan over the grates 17 and immediately in front of the pots 13, during the first part of the reaming operation to catch the blue powder as it is reamed from the pots.

When the reaming operation has progressed to a point where the available blue powder has been recovered, the steel pans are dragged away from the grates 17 by hand and the balance of the material in the pots, which is not high in ore content, is reamed from the pots and falls through the grates 17 and the openings 16 into the basement 15.

Two major disadvantages exist in this present practice. First, the dragging of the steel pans off and on to the grates 17 is a time consuming task. Second, too much blue powder is lost due to spillage from the pans. My apparatus avoids these disadvantages and provides additional improvements for the convenient retrieving of blue powder. In my apparatus, I provide a blue powder receptacle 18 in the basement 15 at the lower end of each of the passages 16. The receptacle 18 has an opening 19 in its upper portion which is aligned with the passage 16.

The opening 19 is covered by hinge plate or trap door 20, which is manually operated by a hand crank 21 on the face wall of the furnaces. When the plate 20 is raised, it exposes the opening 19 in the upper portion of the receptacle 18 to the material passing down the passage 16. When the trap door or plate 20 is lowered it closes the opening 19 and permits the material passing down the passage 16 to pass over the receptacle 18 and into the center portion of the basement 15.

In operation, the plate 20 is raised by operation of the crank handle 21 during the reaming of blue powder from the pots 13. The blue powder passes through the grate 17 and down the passage 16 where it is directed through the opening 19 into the receptacle 18. After the blue powder has been reamed, the plate or trap door 20 is lowered to cover the opening 19 and the balance of the material in the pot is reamed. This material again passes through grate 17 and down passage 16, but because of the lowered or closed position of plate 20, it passes over the receptacle 18 and into the center portion of the basement 15. It will thus be seen that the waste material from the reaming of the pots is effectively separated from the retrievable blue powder by diverting them to different receptacles in the basement 15.

Three chain drag plate conveyors 22a, 22b and 22c are provided in the basement area 15. Two of these conveyors 22a and 22c are used to convey the blue powder from the receptacles 18, and the third 22b is used to convey the waste material from the center of the basement area 15.

As best shown in FIGS. 6, 8 and 12, the chain drag plate conveyors 22a, 22b and 22c consist of endless chains which are passed about sprockets and driven in the usual manner. A series of plates 23 are secured to the chain at spaced intervals and on the working run of the conveyor hang below the chain and drag in a trough 24, the trough 24 being provided with three runner bars 25 as seen best in FIG 8, and a mud pack 26.

The runner bars provide a running surface for the plates 23, and the mud protects the trough from the heat of the material. Guide bars 27 are provided to align the plates 23 sideways in the trough 24. On the return run, the chain is carried by a chain guide 28 and the plates 23 ride on rails 29.

To facilitate the plate passing over the chain sprockets, the plates 23 are mounted on the chain pivotally as seen in FIG. 12, with a lever 30 which rides against the chain to provide rigidity during the working run. Also, as best shown in FIG. 12, the plates 23 have a mud coating 31 on their surface to prevent damage from the heat of the material.

As shown best in FIGS. FIGS. 13 and 14, the conveyors 22a, 22b and 22c extend out the end of the basement area 15 and by means of cross conveyors and elevators 40 the blue powder is disposed in a storage area for further use, and the waste material is filed for disposal. The blue powder storage receptacle 32 consists of two compartments, the first of which, 33, is covered by a screen 34. The screen 34 is slanted across the upper portion of the first receptacle 33, and its lower edge feeds into the second receptacle 35. The wall 50 separates the two compartments, and has an opening 54 for passage of powder.

By this arrangement the blue powder fine enough to pass through the screen 34 is stored in the first compartment 33, and the coarser material passes on to the second compartment 35. The compartments 33 and 35 are elevated as shown and provided with doors 42 and 44 for easy truck loading. The pull ropes 46 extend over pulleys 48 and are attached to the doors for being opened to remove the contents.

FIG. 9 shows a schematic layout of a water spray system disposed in the upper portion of the basement area 15 for cooling the stored material. As shown there are two water delivery pipes 60 with valves 62 and branch pipes 64 for spraying the water. FIG. 5 shows a portion of the spray system in cross section in the basement 15 where the system is designated 37.

FIGS. 10 and 11 show enlarged views of the receptacle 18 for blue powder and the pivotal trap door or plate 20 which separate the blue powder from the waste material. The trap door 20 is hinged at 66, and the crank 68 has a flexible cable 70 for rotating the crank for opening or closing the door 20, by means of the upper crank 21.

From the above and following description it is apparent that with the invention the blue powder reamed from the furnace pots can be quickly and conveniently separated from the waste material by operation of the crank handle 21 and the blue powder and waste material, after separation, can be readily and automatically relocated for disposal or reuse, thus resulting in substantial savings of manpower, time and usable ore.

For the zinc smelting plant as shown in FIGS. 5 and 6, the spray showers such as at 37 are connected to the city waterline or other supply and use ordinary tap water without additional cooling therefor. However, where the plant is used for smelting and making glass, then it is important to refrigerate the cooling water to spray upon the conveyors shown. As the water is sprayed upon the conveyors to cool the material carried thereon, each conveyor has a trough 80 to catch and drain off the water sprayed thereon, with drain pipes 82 for delivering the water to the receiving tank 84. A pump 86 pumps the water up through pipe 88 where it is discharged by spray nozzle 90 into refrigerating tank 92. An intake pipe 94 conveys the water through the maze of cooling pipes 96 and to the cold water outlet pipe 98, from which, being now cooled to about 30 degrees Fahrenheit or less, it is returned back to the sprayers for spraying upon the contents of the conveyors to cool the same. All the pipe which extends over the conveyors, is perforated along its length, so as make an effective cooling spray to cool the material on the conveyors.

As an example of the construction of the tank 92, in one application, the tubing 96 inside the refrigerator tank would be about four inches in diameter, and about 500 feet in length overall inside the tank. In order to cool the spray water in tank 92, a coolant fluid is delivered into the interior of the cooling tank 92 by pipe 100, and discharged by outlet pipe 102, so that the spray water pipes 96 are continuously bathed with a brine or other cold cooling medium to cool them for return to their job of spray cooling the contents of the conveyors. Any well known refrigeration machinery, compressor and associated equipment is used for delivering the cooling medium through pipe 100.

As seen in FIGS. 15 and 16, there is a slide plate 107 with slide rails 110, and upturned side edges or flanges 112, which are turned up to keep the conveyor chains 114 inside the slide plates. At 120 is shown the conveyor box into which the slide plate 107 is. This slide plate 107 forms a lining and keeps the conveyor box 120 from wearing out. The slide plates should have their sides formed with a lap over inside to keep the side plates in line at each section, as these conveyors have to be built in sections. The drag chain is shown at 114, and a drag element or plate 122 is pulled along the conveyor by fastening it to the length of chain as shown also in FIG. 12, for example in another form. As seen in FIG. 17, the drag chain 114 has a lug 124 for fitting through an eye 126, and a pin may be inserted through the hole 128 to hold the parts together. Only one link of the chain 114 is shown in FIG. 17, it being understood that such drag plates 122 are fastened to spaced selected chain links so as to drag or scoop along the material being conveyed by the conveyor chain.

Where the material is glass taken from the melting pots, in a framework or housing similar generally to that of FIGS. 5 and 7, it is also dumped and enters the chambers in the basement of the housing, where it is carried by the conveyors in chunks or blocks of glass to the vicinity of the glass crusher, being guided therein by movement over an inclined screen leading from the end of the conveyor to the crusher. If desired, the inclined screen may function somewhat like screen 34 in FIGS. 13 and 14, to separate out smaller particles of glass first, dropping them into separate compartments for crushing.

It is to be noted that the front end of all the conveyors for the glass is higher than the other end, so that the hot water after spraying the glass on the conveyors, would drain back out of the conveyor and trough, instead of going out with the glass into the crusher. In use, the glass bottle is usually red hot glass, and this hot glass drops through the chutes leading into the basement of the main housing as explained for the zinc smelter form, and is immediately brought under the spray of the ice cold water shower, which continues as it moves along, until it reaches the inclined screen as mentioned above, by which time it would be cooled enough for riding further on a rubber conveyor belt, or directed into a crusher.

FIGS. 3 and 4 show the shower spray stand 100 which has its arms 102 extending outwardly from the post 104 carried by the partition wall 106. The spray heads 108 are carried on the outer ends of the arms 102, so as to support them above one or more of the conveyor belts or chains 22 to spray on the material and cool it off. The number of such conveyors is optional depending upon the nature of the material to be conveyed, and its treatment. The upper edges of the slide plates 106 are turned in somewhat or flanged, so as to hold the mud base in, the mud base is formed with furnace clay and coated with furnace layite for a hardener to protect against the intense heat.

Although preferred embodiments of the invention have been set forth in specific terms, it is understood that various changes may be made in size, shape, materials and arrangement without departing from the spirit and scope of the invention as claimed.

I claim:

1. A material processing and recovery device comprising main housing means, said main housing means having main chamber means for the reception of material containers, heating means for raising the temperature of said material containers for treating said material under predetermined elevated temperatures, lower chamber basement means in said main housing means, basement wall means for dividing said lower chamber basement means into a plurality of discrete compartments, said compartments forming first, second, and third materials receiving means located in said lower chamber basement means for receiving portions of processed materials from said containers, said first material receiving means receiving a predetermined proportion of processed material from said material containers, said second material receiving means receiving a second predetermined proportion of processed material from said material containers, said third material receiving means receiving a third predetermined remaining residue of processed material from said material containers, chute means for directing material removed from the containers selectively to each of said receiving means, and a plurality of conveyor means constructed and arranged in said lower chamber basement means for conveying material removed from said receiving means out from said lower chamber basement means.

2. The construction of claim 1, and wherein said main housing means comprises a plurality of container racks for supporting said material containers therein, said container racks being adapted to be tilted so that said containers have their open ends upwardly oriented during heating to block leakage of said material therefrom and upon completion of said heating process are tiltable downwardly to facilitate removal of material from said container means 3. The construction according to claim 2 comprising platform means underlying said open end of said containers and having grating openings formed therein for allowing said material to pass therethrough.

4. The construction according to claim 2 comprising platform means in said main housing means for supporting workmen operating said device and underlying said open end of said containers, and having grating openings formed therein for allowing said material to pass therethrough, and material guiding gate means in said basement means and removable from one position to guide a predetermined proportion of said material from said chute means into said first or second material receiving means in said basement chamber means, and movable to another position to guide another predetermined proportion of said material from said chute means into said third material receiving means, so that the contents of said material receiving means are dumped onto their respective related said conveyor means for being conveyed to their respective destinations outwardly from said basement chamber means.

5. The construction according to claim 1, and comprising cooling means constructed and arranged in said main housing means for subjecting said material following processing at said elevated temperature to cooling to a substantially reduced temperature during the movement of said material to and on said conveyor means.

6. The construction according to claim 5, and wherein said cooling means comprises a plurality of cooling fluid delivery pipes connected to a source of fluid, a plurality of spray nozzle heads connected to said delivery pipes, and supported in said lower chamber basement means above said conveyor means, for spraying cold fluid upon all material entering said basement means so as to reduce its temperature.

7. The construction according to claim 1, and wherein said material which is being processed comprises zinc-bearing ore, and wherein said material containers are chargeable with said ore so that on being heated, a large first part of said ore is smelted into liquid zinc, said first part of liquid zinc being pourable out of said containers by decanting them, leaving a second part of said ore in the form of richly zinc bearing blue powder, and a third part of said ore in the form of waste slag material having little zinc content, said chamber means being adapted to be reamed to remove firstly said blue powder from said chamber means having first and second compartment means and allowing it to drop into said first or second material receiving means formed in said basement means, and to secondly remove said waste slag material and then allowing it to drop into said third material receiving means.

8. The construction according to claim 7, and comprising first and second blue powder end receptacle means constructed and arranged for receiving said blue powder from said conveyor means, screen means underlying the delivery end of said conveyor means so that said blue powder material is cast thereon, said screen means being inclined and extending over said first end receptacle means whereby blue powder material of fineness less than the mesh of said screen means passes therethrough and drops into said first end receptacle means, and whereby blue powder material of larger sized chunks fails to pass into said first end receptacle means and moves by gravity force into said second end receptacle means, thereby dividing said blue powder material into proportions of predetermined degrees of fineness.

9. The construction according to claim 5, and wherein said material being processed comprises glass, and wherein said material containers are chargeable with glass making ingredients for conversion to glass on being heated to the suitable temperature therefor, means for removing said glass from said containers and for delivering it to said basement chamber means to said conveyor means therein, and cooling means for substantially reducing the temperature of said glass, said cooling means comprising a source of water, spray head means in said basement means and connected by pipes to said source of water, refrigerating tank means interposed in said pipes for reducing the temperature of said water substantially pump means for forcing said refrigerated water through said tank means and to said spray head means, trough means for catching said sprayed water after cooling said glass material, and return pipes for returning said water to said refrigerating tank means for further cooling and spraying.